United States Patent [19]
Francke et al.

[11] Patent Number: 5,516,252
[45] Date of Patent: May 14, 1996

[54] TURNOUT PROTECTION FOR AIRCRAFT TRACTOR

[75] Inventors: Erwin Francke, Gröbenzell; Peter Mölzer, Schwabhausen. both of Germany

[73] Assignee: Krauss Maffei Aktiengesellschaft, Munich, Germany

[21] Appl. No.: 201,370

[22] Filed: Feb. 24, 1994

[30] Foreign Application Priority Data

Feb. 26, 1993 [DE] Germany .................. 43 06 026.9

[51] Int. Cl.$^6$ .................. B60P 3/11; B64F 1/10
[52] U.S. Cl. .................. 414/426; 244/50; 180/904; 340/958
[58] Field of Search .................. 414/426, 429, 414/430; 244/50; 180/169, 14.1, 14.7, 904; 340/458, 431; 280/446.1; 73/628, 432.1

[56] References Cited

U.S. PATENT DOCUMENTS

| | | | |
|---|---|---|---|
| 4,113,041 | 9/1978 | Birkeholm | 244/50 X |
| 4,745,410 | 5/1988 | Schuller et al. | |
| 4,836,734 | 6/1989 | Pollner et al. | 414/430 |
| 4,911,604 | 3/1990 | Pollner et al. | 414/430 X |
| 4,917,564 | 4/1990 | Pollner et al. | 414/430 X |
| 4,955,777 | 9/1990 | Ineson . | |
| 5,013,205 | 5/1991 | Schardt . | |

FOREIGN PATENT DOCUMENTS

| | | |
|---|---|---|
| 0153378B1 | 11/1987 | European Pat. Off. . |
| 0370965A2 | 5/1990 | European Pat. Off. . |
| 2150815 | 4/1972 | Germany . |
| 1953752 | 2/1974 | Germany . |
| 3439409A1 | 4/1986 | Germany . |
| 3606363A1 | 9/1987 | Germany . |
| 3534044C2 | 12/1987 | Germany . |
| 3808260C1 | 3/1989 | Germany . |
| 3822120A1 | 2/1990 | Germany . |
| 4021717A1 | 1/1992 | Germany . |
| 9111127U1 | 2/1992 | Germany . |
| 3420004C2 | 5/1992 | Germany . |
| 4106079A1 | 9/1992 | Germany . |
| 89/03343 | 4/1989 | WIPO ................ 180/904 |

Primary Examiner—David A. Bucci
Assistant Examiner—Stephen Gordon
Attorney, Agent, or Firm—Herbert Dubno; Andrew Wilford

[57] ABSTRACT

An aircraft extending along a longitudinal aircraft axis and having a nose wheel pivotal about an upright wheel axis can be maneuvered by a tractor extending along a longitudinal tractor axis and adapted to engage the nose wheel of the aircraft. The tractor and aircraft axes can extend at an angle to each other that should not exceed a predetermined maximum turnout angle. A turnout protection system has structure on the aircraft that is directed generally perpendicular of the aircraft axis and that is only directed toward the tractor when the aircraft and tractor axes extend generally at the maximum turnout angle relative to each other. At least one electronic sensor on the tractor directed toward the aircraft detects the structure when the aircraft and tractor axes extend generally at the maximum turnout angle relative to each other. A controller on the tractor takes action, e.g. emits an alarm or takes over the tractor steering and/or braking, when the electronic sensor detects that the aircraft and tractor axes extend generally at the maximum turnout angle relative to each other.

8 Claims, 2 Drawing Sheets 5,516,252

TURNOUT PROTECTION FOR AIRCRAFT TRACTOR

FIELD OF THE INVENTION

The present invention relates to an aircraft tractor, that is a vehicle specifically designed to tow an airplane. More particularly this invention concerns a turnout protector for such a tractor.

BACKGROUND OF THE INVENTION

An aircraft tractor is a wheeled prime mover having a tow fork or shovel that engages around or lifts the nose wheel of an aircraft that is to be towed. The aircraft nose wheel can pivot about an upright axis on the aircraft and is normally allowed to pivot freely while it is solidly held by the fork or shovel of the tractor. The tractor is used to move the aircraft, maneuvering it by the captured nose wheel.

A consistent problem with such tractors, as described in U.S. Pat. Nos. 4,745,410 of Schuller, 4,955,777 of Ineson, and 5,013,205 of Schardt as well as in European patent applications 153,378 of Birkeholm and 370,965 of Blanco and in German patent documents 1,953,752 of Lavarenne, 2,150,815 of Xenakis (claiming priority of U.S. Pat. Nos. 804,425 of 13 Oct. 1970) 3,420,004 of Bruggen, 3,439,409 of Lustfeld, 3,534,044, 3,606,363 of Lorenz, 3,808,260 of Henneberg, 3,822,120 of Hengvoss, 4,021,717 of Kutschers, 4,106,079 of Andres, and G 9,111,127, is that the vehicle can tip over if the tractor turns so that it defines an excessively small angle with the aircraft. More particularly, for each aircraft there is a maximum turnout angle that is the maximum angle that the aircraft axis should extend at relative to its direction of movement, which in the case of a towed aircraft corresponds to the longitudinal axis of the towing tractor. If the tractor overturns, that is turns too sharply so that this maximum turnout angle is exceeded, there is a significant danger of damage to the aircraft.

Hence various systems are known to detect the angular position of the aircraft relative to the tractor. In the system of above-cited German 3,534,044 two proximity detectors are positioned on the tractor to either side of its longitudinal axis and both trained on the towed aircraft. The difference between the sensed distances can be translated into the angle of the aircraft relative to the tractor and, when this calculated angle approaches the critical turnout angle, an alarm can be emitted or other action taken. The problem with this system is that the front end of the aircraft is rounded, so accurately determining its position is virtually impossible. Thus such a system is quite inaccurate.

In a simpler and cruder system the flaps that normally cover the port from which the nose wheel emerges are each provided with a red marking that can only be seen by someone in front of the aircraft when the aircraft is angled considerably to the viewing location. The location of the red marks is such that they should only in theory be visible to a driver of a tow tractor when the threshold turnout angle is being approached. Thus when he or she sees these markings, some steering correction should be made.

Neither of these systems is highly accurate or sufficiently automatic to satisfy strict safety standards.

OBJECTS OF THE INVENTION

It is therefore an object of the present invention to provide an improved turnout protector for an aircraft-towing tractor.

Another object is the provision of such an improved turnout protector for an aircraft-towing tractor which overcomes the above-given disadvantages, that is which simply and automatically detects when the aircraft position is exceeding the threshold turnout angle.

SUMMARY OF THE INVENTION

An aircraft extending along a longitudinal aircraft axis and having a nose wheel pivotal about an upright wheel axis can be maneuvered by a tractor extending along a longitudinal tractor axis and adapted to engage the nose wheel of the aircraft. The tractor and aircraft axes can extend at an angle to each other that should not exceed a predetermined maximum turnout angle. A turnout protection system has according to the invention structure on the aircraft that is directed generally perpendicular of the aircraft axis and that is only directed toward a location on the tractor when the aircraft and tractor axes extend generally at the maximum turnout angle relative to each other. At least one electronic sensor on the tractor directed toward the aircraft detects the structure when the aircraft and tractor axes extend generally at the maximum turnout angle relative to each other. A controller on the tractor takes action, e.g. emits an alarm or takes over the tractor steering and/or braking, when the electronic sensor detects that the aircraft and tractor axes extend generally at the maximum turnout angle relative to each other.

Thus with this system the structure, which can simply be the sides of the aircraft fuselage somewhat aft of its front end, is only turned perpendicular to the sensor or sensors when the maximum turnout angle is achieved. This gives a very accurate determination of the aircraft position relative to the tractor.

According to this invention the sensor includes a transmitter for outwardly emitting a beam of radiation reflectable by the structure, and a receiver immediately adjacent the transmitter and directed outwardly along the beam so that the beam will be reflected back into the receiver means when the structure is generally perpendicular to the beam. The tractor has two such sensors symmetrically flanking the tractor axis and the beams extend backward at an angle to the tractor axis. Each beam is fan-shaped and has a horizontal beam spread angle of at most 20° and a vertical beam spread angle of at least 45°.

The controller can include means for emitting a warning signal when the aircraft and tractor axes approach the maximum turnout angle and means for emitting a different warning signal when the aircraft and tractor axes are at the maximum turnout angle relative to each other. It can further emit an acoustic or visible alarm when the aircraft and tractor axes are at the maximum turnout angle relative to each other. Means may be provided for recording when the aircraft and tractor axes are at the maximum turnout angle relative to each other. The controller may further affect the steering and/or braking of the tractor when the aircraft and tractor axes are at the maximum turnout angle relative to each other.

In accordance with further features of the invention the aircraft has nose-wheel flaps that are provided with markings of a predetermined color constituting the structure. The sensor is a camera having a filter for the predetermined color directed along the tractor axis at the aircraft. The structure can also be reflective markings and the sensor can be an autocollimation device. This autocollimation device is centrally mounted on the tractor and is directed backward parallel to the tractor axis. It can be a PSP sensor with a cylindrical lens centered on a horizontal axis.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
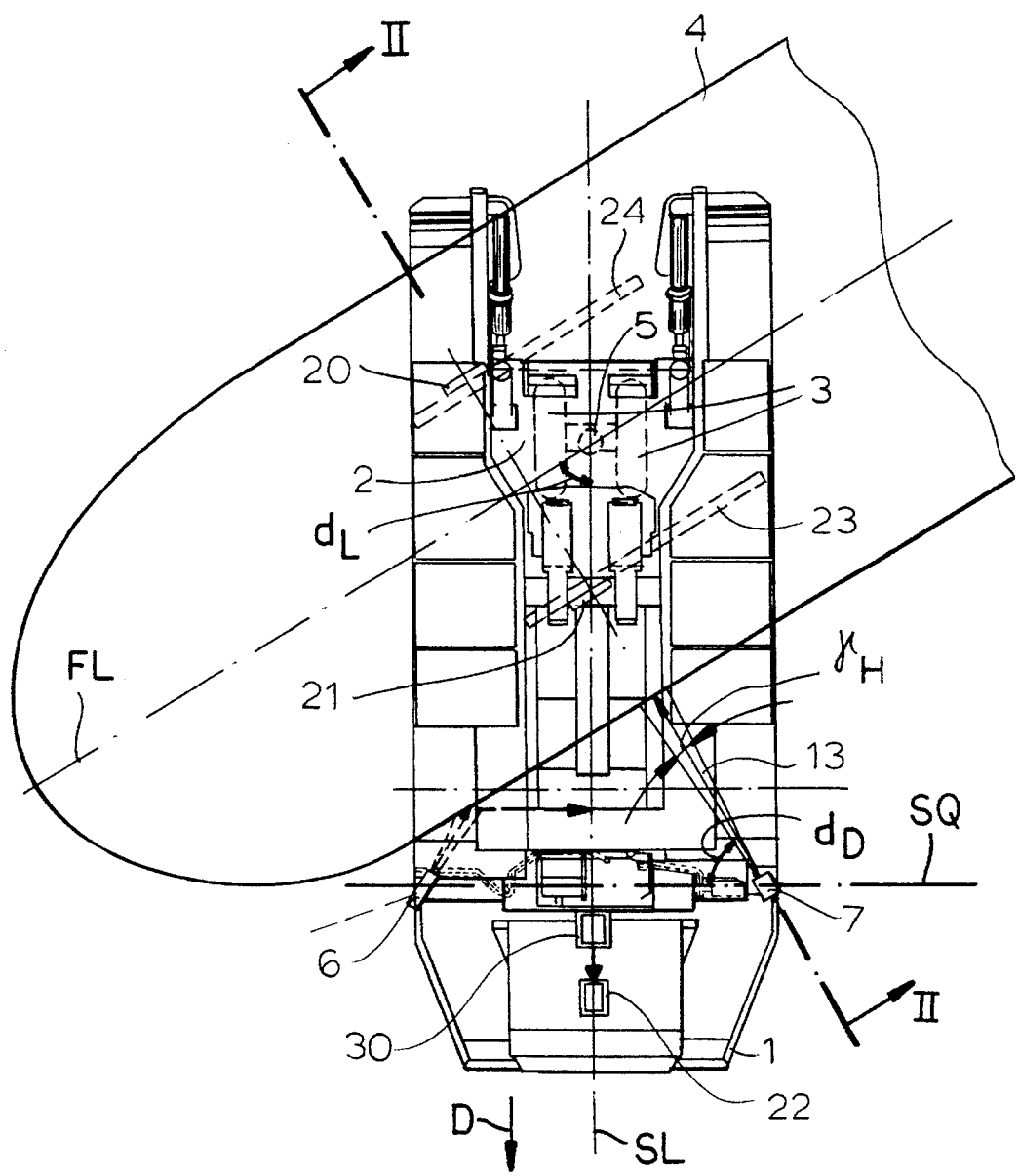
FIG. 1 is a partly schematic top view of a turnout-protection system according to the invention.

As seen in FIG. 1 a tractor 1 having a longitudinal axis SL and a transverse axis SQ is provided with a device 2 for picking up and holding nose wheels 3 pivotal about an upright axis 5 on an aircraft whose outline is shown at 4 and which has a longitudinal axis FL. The tractor 1 normally moves in a direction D parallel to its axis SL and thus maneuvers the aircraft 4 whose nose wheels 3 are sitting on it, between its back wheels. While during normal travel the axes SL and FL are generally parallel to each other, as the tractor 1 turns, an angle $d_L$ is formed between these axes. This angle $d_L$ must not exceed a predetermined maximum, normally about 60°.

Figure 2:
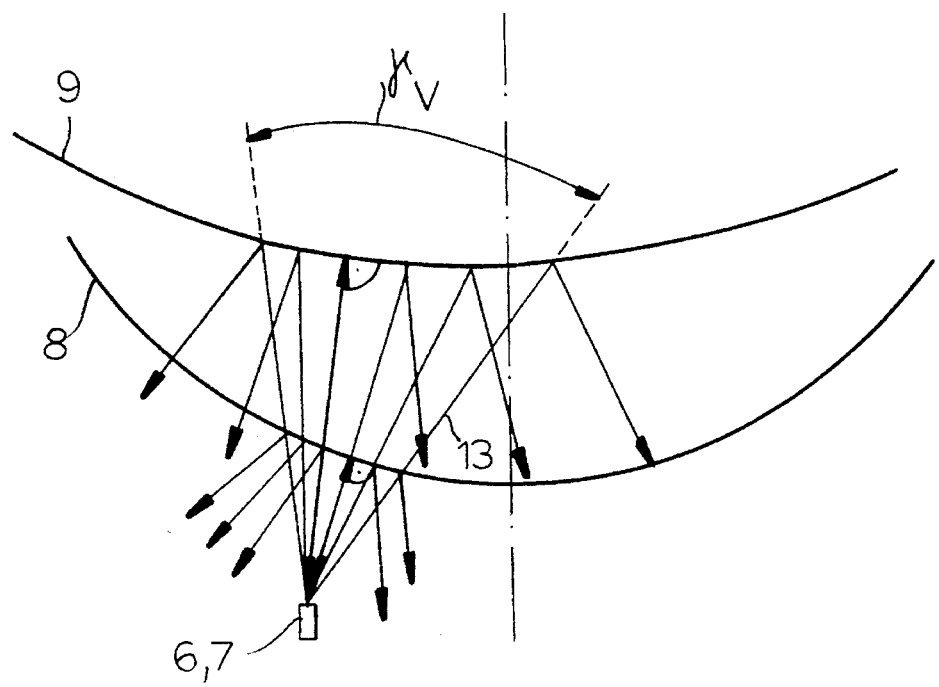
FIG. 2 is a diagram illustrating the operation of the system.
Figure 3:
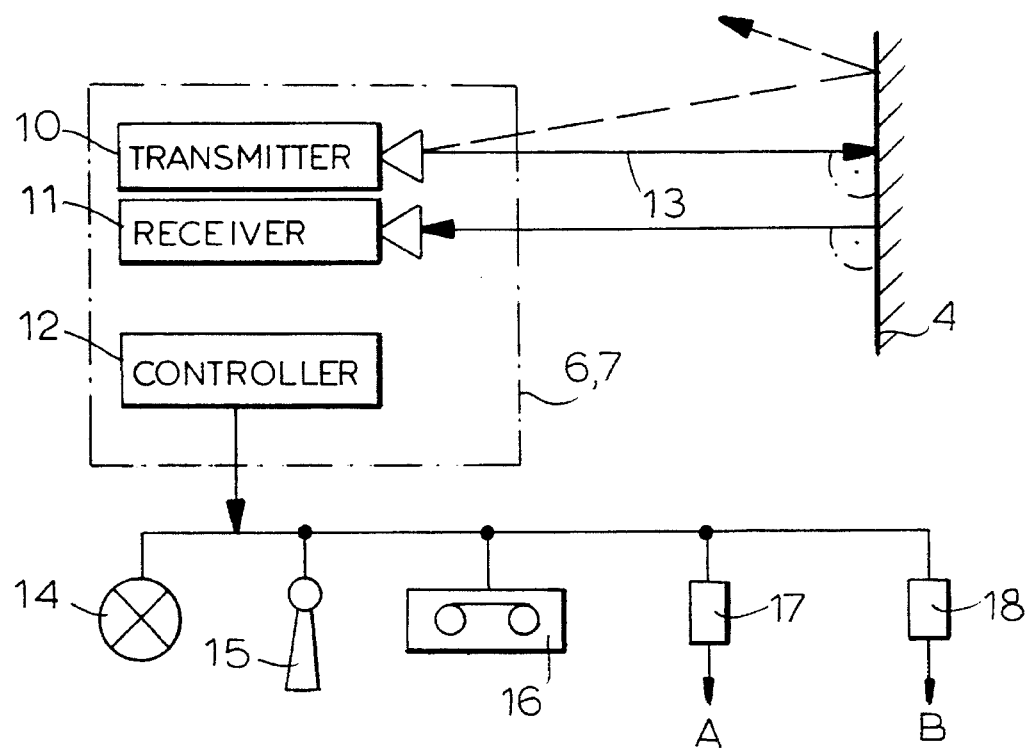
FIG. 3 is a circuit diagram of the system of this invention.

According to the invention the front part of the tractor 1 is provided with a pair of sensors 6 and 7 symmetrically flanking the axis SL and aligned along the axis SQ with each other. These sensors 6 and 7 are directed back and inward at an angle $d_D$ to the axis SQ. As also shown in FIGS. 2 and 3 each sensor 6 and 7 has a transmitter 10 that emits a beam 13 of radiation, which may be, for instance, radio-frequency, light (e.g. infrared), or sound energy, that is aimed in a fan-shaped beam having a horizontal spread angle $\gamma_H$ of at most 20° and a vertical spread angle $\gamma_V$ of at least 45°. The fan shape ensures that, whether the aircraft is small as indicated at 8 or large as indicated at 9, some of the wave energy will impinge on it at 90° and be reflected back when the aircraft axis FL is perpendicular to the beam 13. This beam 13 strikes the side of the fuselage of the aircraft 4 and, when the aircraft is aligned perpendicular to the beam 13, some of the radiation is reflected back to a receiver 11 built into each sensor 6 and 7. The received radiation is evaluated by a controller 12 which can operate a visible alarm 14, an acoustic alarm 15, a recording device 16, a device 17 that is connected at A to the tractor steering system, and/or a device 18 that is connected at B to the tractor braking system.

As one of the receivers 11 starts to pick up some reflected radiation, it first emits a warning signal, for instance a blinking of the lamp 14 and/or a periodic beeping from the horn 15. Once a full-strength reflection is received, indicating that the aircraft axis FL and the tractor axis SL are forming an undesired maximum turnout angle, the controller 14 can then turn the lamp 14 and horn 15 on to stay on. If the controller 14 then detects a worsening situation it can affect the tractor's steering and/or braking via the devices 17 and 18 so that the condition does not become too perilous.

As also shown in FIG. 1 it is possible to provide special markings 20 and 21 on flaps 23 and 24 that are flush with the aircraft fuselage when the plane is in flight but which extend downward parallel to the axis FL when the nose wheels 3 are extended. These markings can be detected by an autocollimation device 22 or a CCD camera 30 situated at the front end of the tractor 1 on the axis SL. When the aircraft is turned enough for these markings to fall in the narrow detection beam of these sensors 22 or 30 they produce outputs like the controller 12 to any of the various devices 14 through 18 shown in FIG. 3.

The autocallimator 22 can have a cylindrical lens directed horizontally backward on the axis SL. It can have a PSD (position sensitive device) sensor.

The camera 30 can have a filter for the color of the markings 21, for instance a red filter.

We claim:

1. In combination with:

an aircraft extending along a longitudinal aircraft axis and having a nose wheel pivotal about an upright wheel axis; and a tractor extending along a longitudinal tractor axis and adapted to engage the nose wheel and tow the aircraft, whereby the tractor and aircraft axes can extend at an angle to each other that should not exceed a predetermined maximum turnout angle, a turnout protection system comprising:

radiation-reflecting structure on the aircraft that extends generally parallel to the aircraft axis and is reflectively effective transversely of the aircraft axis and that is only oriented generally perpendicular to locations on the tractor when the aircraft and tractor axes extend generally at the maximum turnout angle relative to each other;

means including a pair of electronic sensors on the tractor at the locations directed toward the aircraft and each including transmitter means for outwardly emitting a fan-shaped beam of radiation reflectable by the structure having a horizontal beam spread angle of at most 20° and a vertical beam spread angle of at least 45°, and receiver means immediately adjacent the transmitter and directed outwardly along the beam, whereby the beam will be reflected back into the receiver means substantially only when the structure is generally perpendicular to the beam; and control means on the tractor for taking action when either of the electronic sensors detects that the aircraft and tractor axes extend generally at the maximum turnout angle relative to each other.

2. In combination with:

an aircraft extending along a longitudinal aircraft axis and having a nose wheel pivotal about an upright wheel axis; and a tractor extending along a longitudinal tractor axis and adapted to engage the nose wheel and tow the aircraft, whereby the tractor and aircraft axes can extend at an angle to each other that should not exceed a predetermined maximum turnout angle, a turnout protection system comprising:

radiation-reflecting structure on the aircraft that extends generally parallel to the aircraft axis and is reflectively effective transversely of the aircraft axis and that is only oriented generally perpendicular to locations on the tractor when the aircraft and tractor axes extend generally at the maximum turnout angle relative to each other;

means including a pair of electronic sensors on the tractor at the locations directed toward the aircraft and each including transmitter means for outwardly emitting a beam of radiation reflectable by the structure, and receiver means immediately adjacent the transmitter means, capable of detecting the reflected beam of the respective transmitter means, and directed outwardly along the beam, whereby the beam will be reflected back into the receiver means substantially only when the structure is generally perpendicular to the beam; and control means on the tractor for taking action when either of the receiver means detects the respective reflected beam when the aircraft and tractor axes extend generally at the maximum turnout angle relative to each other.

3. The combination turnout protection system defined in claim 2 wherein the tractor sensors symmetrically flank the tractor axis and the beams extend backward relative to a normal direction of travel of the tractor at an angle to the tractor axis.

4. The combination turnout protection system defined in claim 2 wherein the beam is fan-shaped and has a horizontal beam spread angle of at most 20° and a vertical beam spread angle of at least 45°.

5. The combination turnout protection system defined in claim 2 wherein the control means includes means for emitting a warning signal when the aircraft and tractor axes approach the maximum turnout angle and means for emitting a different warning signal when the aircraft and tractor axes are at the maximum turnout angle relative to each other.

6. The combination turnout protection system defined in claim 2 wherein the control means includes means for emitting an audible alarm when the aircraft and tractor axes are at the maximum turnout angle relative to each other.

7. The combination turnout protection system defined in claim 2 wherein the control means includes means for emitting a visible alarm when the aircraft and tractor axes are at the maximum turnout angle relative to each other.

8. The combination turnout protection system defined An claim 2 wherein the control means includes means for recording when the aircraft and tractor axes are at the maximum turnout angle relative to each other.

\* \* \* \* \*